(12) United States Patent
Lecheler et al.

(10) Patent No.: US 11,837,420 B2
(45) Date of Patent: Dec. 5, 2023

(54) ARC EXTINGUISHING SYSTEMS

(71) Applicant: Siemens Aktiengesellschaft, Munich (DE)

(72) Inventors: Stefan Lecheler, Berlin (DE); Martin Bindrich, Berlin (DE); Juergen Einschenk, Panketal (DE); Karsten Freundt, Falkensee (DE)

(73) Assignee: Siemens Aktiengesellschaft, Munich (DE)

( * ) Notice: Subject to any disclaimer, the term of this patent is extended or adjusted under 35 U.S.C. 154(b) by 144 days.

(21) Appl. No.: 17/598,405

(22) PCT Filed: Mar. 24, 2020

(86) PCT No.: PCT/EP2020/058101
§ 371 (c)(1),
(2) Date: Sep. 27, 2021

(87) PCT Pub. No.: WO2020/193519
PCT Pub. Date: Oct. 1, 2020

(65) Prior Publication Data
US 2022/0181106 A1 Jun. 9, 2022

(30) Foreign Application Priority Data
Mar. 27, 2019 (DE) ...................... 10 2019 204 227.9

(51) Int. Cl.
*H01H 33/55* (2006.01)
*H01H 33/42* (2006.01)
*H02B 13/025* (2006.01)

(52) U.S. Cl.
CPC .......... *H01H 33/555* (2013.01); *H01H 33/42* (2013.01); *H02B 13/025* (2013.01)

(58) Field of Classification Search
CPC ...... H01H 33/555; H01H 33/42; H01H 33/68; H01H 2033/306; H02B 13/025
(Continued)

(56) References Cited

U.S. PATENT DOCUMENTS 3,531,609 A * 9/1970 Gratzmuller ........... H01H 33/34
218/116
4,130,850 A * 12/1978 Cronin ..................... H02H 5/08
361/57
(Continued)

FOREIGN PATENT DOCUMENTS

CN 105374615 A * 3/2016
DE 1640215 A1 5/1970
(Continued)

OTHER PUBLICATIONS

Machine translation of Fan et al. Chinese Patent Document CN 105374615 A Mar. 2, 2016 (Year: 2016).*
(Continued)

*Primary Examiner* — Kevin J Comber
(74) *Attorney, Agent, or Firm* — Laurence A. Greenberg; Werner H. Stemer; Ralph E. Locher

(57) ABSTRACT

A system for short-circuiting or grounding low-voltage and/or medium-voltage installations. The system includes at least one fault detection unit for detecting an arc and at least one signal-processing unit for processing signals from the at least one fault detection unit. The signal-processing unit is or can be connected to the fault detection unit for signal transmission. The system further includes at least one control unit which is or can be connected to the signal-processing unit for signal transmission, an electrical energy storage device in or on the control unit, and at least one fast-switching switching element having a mechanical energy store.

19 Claims, 2 Drawing Sheets

(58) Field of Classification Search
USPC .......................................................... 361/37
See application file for complete search history.

(56) References Cited

U.S. PATENT DOCUMENTS

| | | | | |
|---|---|---|---|---|
| 4,730,092 | A * | 3/1988 | Eggert | H01H 33/34 |
| | | | | 218/84 |
| 5,534,858 | A * | 7/1996 | Tinkham | H01H 33/32 |
| | | | | 340/870.07 |
| 5,933,308 | A * | 8/1999 | Garzon | H01H 33/26 |
| | | | | 361/62 |
| 2010/0142103 | A1 * | 6/2010 | Thrue | H02B 13/025 |
| | | | | 361/42 |
| 2014/0055886 | A1 | 2/2014 | Spangenberg et al. | |
| 2016/0126032 | A1 * | 5/2016 | Sihler | H01H 33/68 |
| | | | | 307/112 |
| 2018/0090914 | A1 * | 3/2018 | Johnson | H02B 1/20 |

FOREIGN PATENT DOCUMENTS

| | | | | |
|---|---|---|---|---|
| EP | 3016123 | A1 | 5/2016 | |
| RU | 2562453 | C1 * | 9/2015 | H01H 33/72 |

OTHER PUBLICATIONS

Machine translation of Alf et al. Russian Patent Document RU 2562453 C1 Sep. 10, 2015 (Year: 2015).*

* cited by examiner

ARC EXTINGUISHING SYSTEMS

FIELD AND BACKGROUND OF THE INVENTION

The invention relates to an arc extinguishing system, in particular a system for short-circuiting or grounding low-voltage installations and/or medium-voltage installations and components of an arc extinguishing system of this kind.

Open arcs in switchgear in low-voltage and medium-voltage technology generally cause great damage, and therefore have great damage potential, in particular through longer-term failure of switchgear. In order to reduce the consequences of an open arc, such as carbon black, heat and pressure, a short circuit or ground fault can be produced to divert the electrical energy that feeds the open arc.

As a result of this measure, the burn time of the open arc is significantly reduced, and damage can be reduced or even avoided completely, at least to the extent that the switchgear can be started up again.

Precautions have to be taken here to avoid undesirable grounding during normal operation.

This occurs as a result of pressure measurements, light detectors or current measurements, or combinations of the methods mentioned, for example.

A further important factor is a short time delay between detection of an arc and completed short-circuiting or grounding.

It is also important for restarting that the short-circuiting unit d not have to be replaced, and the process is therefore reversible.

The prior art discloses in particular pyrotechnic solutions and electromagnetic solutions for fast switching.

SUMMARY OF THE INVENTION

It is therefore an object of the invention to provide a system for short-circuiting or grounding low-voltage and/or medium-voltage installations and/or components for the system that eliminates the disadvantages from the prior art.

The object is achieved by a system for short-circuiting or grounding low-voltage and/or medium-voltage installations, system for short, as claimed in the independent claim(s) and the claims that are dependent thereon.

Low-voltage and/or medium-voltage installations are also referred to as switchgear for short below.

To this end, a system is proposed,
with at least one fault detection unit for detecting an arc,
at least one signal processing unit for processing signals of the at least one fault detection unit, wherein the signal processing unit is or can be connected to the fault detection unit for signal transmission,
at least one control unit that is or can be connected to the signal processing unit for signal transmission, having an electrical energy storage apparatus in or on the control unit, and
with at least one fast-switching switching element having a mechanical energy store, wherein the fast-switching switching element is or can be connected to the control unit for the purpose of transferring electrical triggering energy from the electrical energy storage apparatus and the electrical triggering energy is used, or can be used, to effect triggering of a switching operation of the fast-switching switching element, wherein drive energy stored in the mechanical energy store effects, or can effect, the switching operation.

It is advantageous for the triggering energy to be configured to be high, in particular to be or to be able to be configured to be high in comparison to potentially occurring electromagnetic interference, in particular in relation to the electromagnetic compatibility of switchgear that is or can be connected. Configured to be high in this context means configured to be higher than the corresponding reference value of the potentially occurring electromagnetic interference or the electromagnetic compatibility of the associated switchgear or associated low-voltage and/or medium-voltage installation by at least a factor of 2, preferably at least a factor of 5, particularly preferably at least a factor of 10 or at least a factor of 100.

It is also advantageous for the electrical energy store to be arranged physically separately from the mechanical energy store, for example a spring energy store or disk spring energy store. In particular, it is preferred that the control unit is arranged with the electrical energy store in a low-voltage compartment, whereas the fast-switching switching element is arranged with the mechanical energy store in the region of a busbar and/or switchgear, low-voltage and/or medium-voltage installation to be protected to which the system is or can be connected. This makes it possible to prevent false triggering through electromagnetic interference in the region of the busbar, and demands on the electromagnetic compatibility of the system for short-circuiting or grounding low-voltage installations and/or medium-voltage installations are easier to meet. Electrical components that are arranged in the low-voltage compartment, for example capacitors, are therefore also protected against unnecessary thermal loading in the surroundings of the busbars to be protected and/or the rest of the switchgear to be protected.

Furthermore, it is advantageous that the fault detection unit for detecting an arc has an optical sensor for optically detecting an arc and a current sensor that monitors the current characteristic on one or more busbars to be protected to which the system is or can be connected.

It is also advantageous that the control unit has an interface for connecting a computer or a data transmission unit. This is advantageous for the setup and/or maintenance of the control unit in particular.

It is further preferred that there are inputs on the control unit (30) to block or trigger triggering of a switching operation.

It is also preferred that an emergency power supply can be provided or is arranged at an input, an input for an optional emergency power supply.

There is also preference for a system, wherein the fast-switching switching element has an insulating fluid, in particular an insulating oil, as insulating medium in a switching space, wherein the insulating medium completely fills the switching space having built-in components, such as switching contacts, for example, wherein a switching operation in the switching space can be used to change over between a closed, i.e. an electrically conductive, switching position and an open, i.e. an electrically insulated, switching position, in particular by moving a moving contact into contact with a fixed contact or by moving the moving contact away from the fixed contact, wherein an equalizing vessel for the insulating fluid adjoins the switching space and the equalizing vessel has a variable volume, wherein the variable volume is produced by an equalizing piston present in the equalizing vessel and a predeterminable variable volume is filled with the insulating fluid, wherein the piston is loaded with a pressure element in such a way that a force acts on the equalizing piston in such a way that an expansion of the insulating medium works against the force acting on the equalizing piston and, when the volume of the insulating fluid decreases, the equalizing piston is pushed into the equalizing vessel in such a way that the variable volume is completely filled with the insulating fluid, wherein the equalizing piston interacts with a signaling element, in particular a microswitch, in such a way that a warning signal is or can be triggered in the event of a drop below a value for the variable volume.

Alternatively or additionally to the warning signal, switching of the fast-switching switching element can also be prevented if there is a drop below the predetermined value for the variable volume, and therefore of the volume of the insulating fluid, or said predetermined value is reached, or there is a drop below a further predetermined value for the variable volume, and therefore of the volume of the insulating fluid, or said further predetermined value is reached.

Alternatively, instead of the equalizing piston, a further bellows, in particular corrugated bellows or folded bellows, is used that replaces parts or the entire equalizing vessel or adjoins a free end of the equalizing vessel. The signaling element is then provided at a free end of the further bellows analogously to the arrangement with the equalizing piston.

It is preferred that the warning signal can be forwarded to a control unit and the control unit indicates the presence of a warning signal, and therefore potential loss of oil.

It is particularly preferred that the system is integrated in a low-voltage and/or medium-voltage installation, switchgear, or can be integrated in the latter, in particularly is or can be integrated permanently or removably.

The exemplary embodiments are explained below with reference to figures.

DETAILED DESCRIPTION OF THE INVENTION

Figure 1:
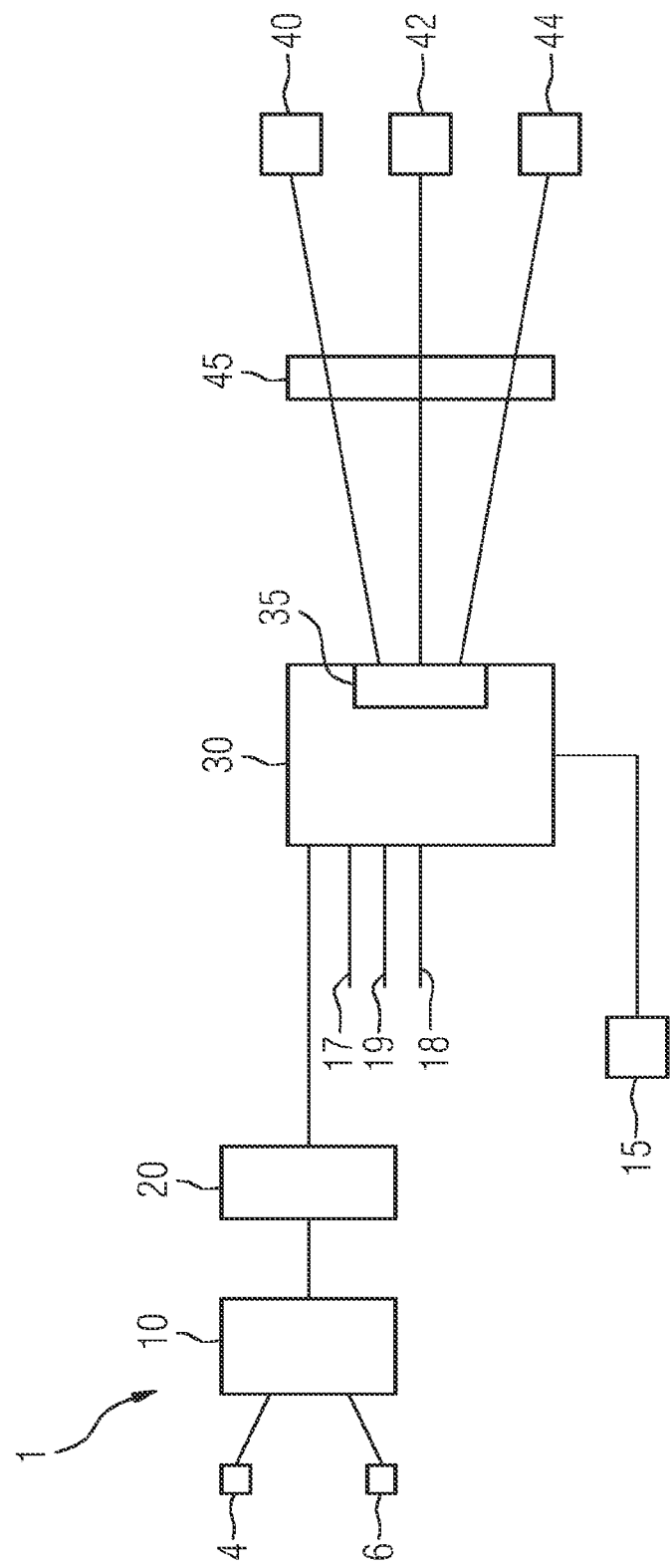
FIG. 1: Schematic design of the system for short-circuiting or grounding low-voltage installations and/or medium-voltage installations.

FIG. 1 shows an exemplary schematic design of the system for short-circuiting or grounding low-voltage installations and/or medium-voltage installations 1. A fault detection unit 10 serves to detect an arc by means of different sensors, in particular optical sensors 4 and current sensors 6. If the individual sensors of the fault detection unit 10 detect a signal, said signal is routed from the fault detection unit 10 to a signal processing unit 20 for evaluation. The signal processing unit 20 then determines, also on the basis of the correlation of the individual measured values of the individual sensors, for example, whether there is a fault that requires grounding or short-circuiting. If such a fault, in particular arc, is identified, a signal, in particular a fault signal, is routed from the signal processing unit 20 to a control unit 30. The control unit 30 then provides fast-switching switching elements 40, 42, 44 with electrical triggering energy from an electrical energy storage apparatus 35. By way of the electrical triggering energy, a mechanical energy store in the fast-switching switching elements 40, 42, 44 that provides drive energy for the fast-switching switching elements 40, 42, 44 for switching operations, in particular short-circuiting or grounding, is triggered, or a central mechanical energy store 45 that provides drive energy for the fast-switching switching elements 40, 42, 44 for switching operations, in particular short-circuiting or grounding, is triggered.

The control unit 30 here has an electrical energy storage apparatus 35 that is installed in the control unit 30, but the electrical energy storage apparatus 35 can also be arranged in physical proximity to the control unit 30. For the setup and/or maintenance of the control unit 30, the control unit 30 optionally has an interface for connecting a computer or a data transmission unit 15. As a further option, there are inputs 18 and 19 to block or trigger triggering of a switching operation. An emergency power supply can also optionally be provided or arranged at the optional input 17.

Figure 2:
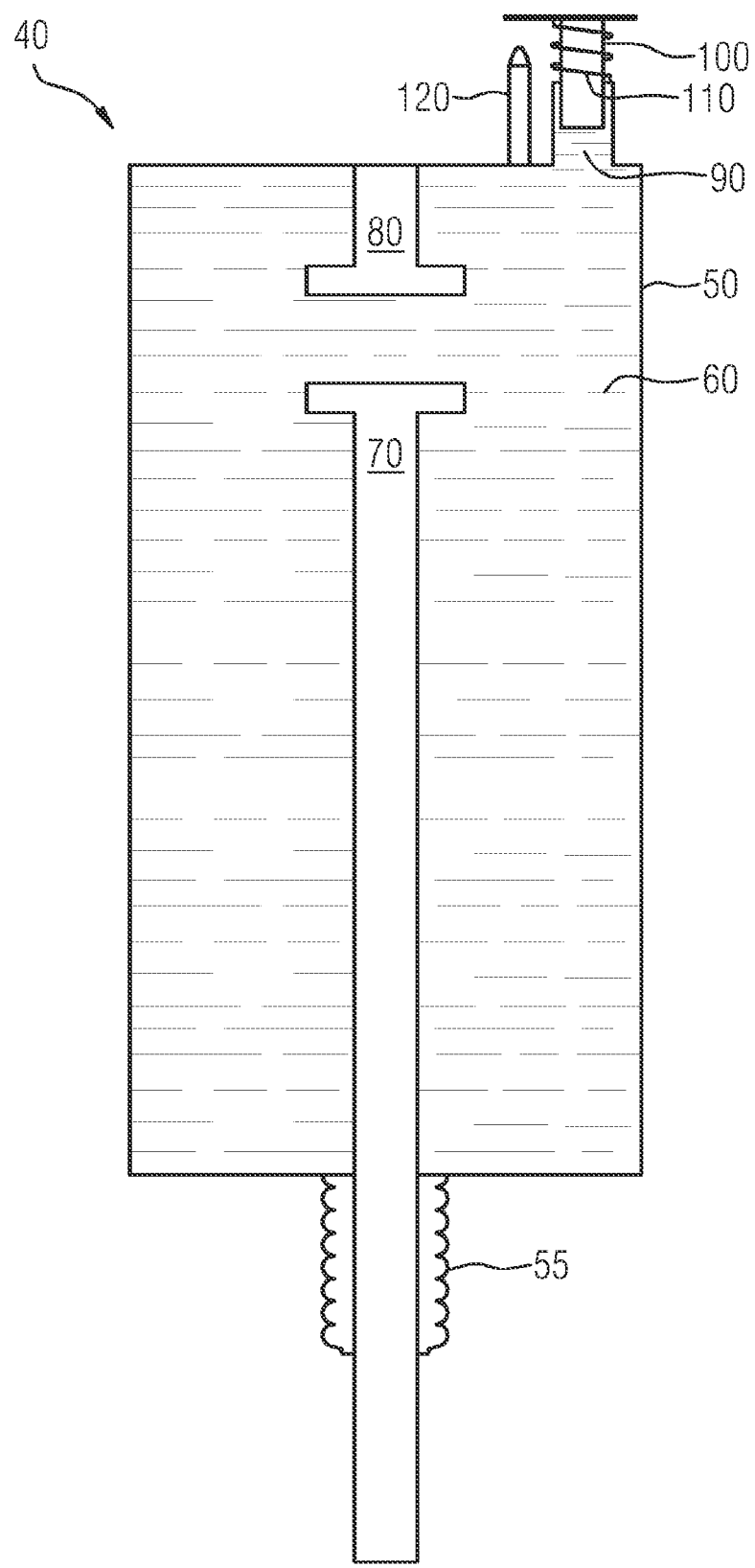
FIG. 2: Schematic design of a fast-switching switching element with an oil loss warning system.

FIG. 2 shows an exemplary schematic design of a fast-switching switching element 40 with an oil loss warning system. The fast-switching switching element 40 here has a switching space 50 in which a moving contact 70 is arranged so as to be movable and a fixed contact is arranged. The moving contact is arranged in the switching space 50 so as to be movable for example by means of a bellows 55 or through a hermetically sealed passage. An equalizing vessel 90 adjoins the switching space 50 so that the insulating fluid can cross between the switching space 50 and the equalizing vessel 90. The equalizing vessel 90 is closed off on a side not connected to the switching space 50 by way of an equalizing piston 100 that is mounted in a movable but sealing manner. The insulating fluid 60 completely fills the switching space 50, with its built-in components, and the equalizing vessel 90, up to the equalizing piston. A pressure element 110 acts on the equalizing piston 100 and produces a force on the equalizing piston 100 in such a way that said equalizing piston is pushed into the equalizing vessel 90, and, when the volume of the insulating fluid 60 decreases, pushes the equalizing piston into the equalizing vessel 90 or, when the volume of the insulating fluid 60 increases, pushes the equalizing piston 100 out of the equalizing vessel 90 against the force of the pressure element 110, and therefore compensates for a change of volume of the insulating fluid 60. If the volume of the insulating fluid decreases below a predetermined or predeterminable value, the equalizing piston then interacts with a signaling element 120; in this case it pushes a microswitch as the signaling element 120. In the event of a drop below a predetermined or predeterminable value for the volume of the insulating fluid 60, a warning signal is therefore triggered and/or the readiness for switching is cancelled, or blocked.

LIST OF REFERENCE SIGNS

1 System for short-circuiting or grounding low-voltage installations and/or medium-voltage installations;
4 Optical sensor;
6 Current sensor;
10 Fault detection unit;
15 Computer or data transmission unit;
17 Input for optional emergency power supply;
18 Optional input;
19 Optional input;
20 Signal processing unit;
30 Control unit;
35 Electrical energy storage apparatus;
40 Fast-switching switching element;
42 Fast-switching switching element;
44 Fast-switching switching element;
45 Optional central mechanical energy store;
50 Switching space;
55 Hermetically sealed bellows;

60 Insulating fluid, in particular insulating oil;
70 Moving contact;
80 Fixed contact;
90 Equalizing vessel;
100 Equalizing piston;
110 Pressure element, in particular spring element;
120 Signaling element.

The invention claimed is:

1. A system for short-circuiting or grounding a voltage installation, the system comprising:
at least one fault detection unit for detecting an arc;
at least one signal processing unit for processing signals of the at least one fault detection unit, said signal processing unit being connected to, or configured for connection to, said fault detection unit for signal transmission;
at least one control unit connected to, or configured for connection to, said signal processing unit for signal transmission, and an electrical energy storage apparatus in or on said at least one control unit;
at least one fast-switching switching element having a mechanical energy store, said fast-switching element being connected to, or configured for connection to, said control unit for transferring electrical triggering energy from said electrical energy storage apparatus, wherein the electrical triggering energy is used, or usable, to effect a triggering of a switching operation of said at least one fast-switching switching element, wherein said mechanical energy store is effective to perform the switching operation with the drive energy stored in said mechanical energy store; and
said control unit and said electrical energy storage apparatus being disposed in a voltage compartment, whereas said fast-switching switching element and said mechanical energy store are disposed in a region of a busbar and/or a switchgear to be protected.

2. The system according to claim 1 configured for a three-phase apparatus, wherein said at least one fast-switching switching element is a plurality of fast-switching elements each assigned to a respective phase.

3. The system according to claim 1, wherein the electrical triggering energy is set to a high level relative to potentially occurring electromagnetic interference.

4. The system according to claim 3, wherein the electrical triggering energy is set to a high level in comparison with an electromagnetic compatibility of switchgear.

5. The system according to claim 1, wherein said electrical energy storage apparatus is disposed physically separate from said mechanical energy store.

6. The system according to claim 1, wherein said fault detection unit for detecting an arc has an optical sensor for optically detecting an arc and a current sensor configured to monitor a current characteristic on one or more busbars to be protected.

7. The system according to claim 1, wherein said control unit comprises an interface for connecting a computer or a data transmission unit.

8. The system according to claim 1, wherein said control unit includes inputs for blocking or initiating a triggering of a switching operation.

9. The system according to claim 1, wherein said control unit comprises an input for an emergency power supply.

10. The system according to claim 1, wherein:
said at least one fast-switching switching element has an insulating medium, being an insulating fluid in a switching space, wherein said insulating medium completely fills said switching space with built-in components, wherein a switching operation in said switching space changes over between a closed switching position and an open switching position; and
wherein an equalizing vessel with a variable volume for said insulating fluid adjoins said switching space.

11. The system according to claim 10, further comprising an equalizing piston in said equalizing vessel for adjusting the variable volume, wherein a predeterminable amount of the variable volume is filled with said insulating fluid and said equalizing piston is loaded with a pressure element with a force acting on said equalizing piston counter to an expansion of the insulating fluid and, when a volume of the insulating fluid decreases, said equalizing piston is pushed into said equalizing vessel and the variable volume is completely filled with the insulating fluid; and
said equalizing piston interacts with a signaling element configured to issue a warning signal when the variable volume drops below a predeterminable value for the variable volume.

12. The system according to claim 11, wherein said signaling element is a microswitch.

13. The system according to claim 11, wherein the warning signal is transmitted to said control unit connected to said at least one fast-switching element.

14. The system according to claim 10, wherein the insulating fluid is an insulating oil.

15. The system according to claim 10, wherein the switching operation moves a movable contact into contact with a fixed contact or moves the movable contact away from the fixed contact.

16. The system according to claim 10, wherein said variable volume is formed by a bellows, disposed to replace a part or an entire said equalizing vessel or adjoins a free end of said equalizing vessel.

17. The system according to claim 16, wherein said bellows is a corrugated bellows or a folded bellows.

18. The system according to claim 16, further comprising a signaling element configured to issue a warning signal when the variable volume drops below a predeterminable value for the variable volume.

19. The system according to claim 10, wherein said signaling element is a microswitch.

* * * * *

UNITED STATES PATENT AND TRADEMARK OFFICE
CERTIFICATE OF CORRECTION

PATENT NO. : 11,837,420 B2
APPLICATION NO. : 17/598405
DATED : December 5, 2023
INVENTOR(S) : Stefan Lecheler et al.

It is certified that error appears in the above-identified patent and that said Letters Patent is hereby corrected as shown below:

In the Claims

Column 5, Lines 22-32, Claim 1 should read as follows:
    at least one fast-switching switching element having a mechanical energy store, said fast-switching switching element being connected to, or configured for connection to, said control unit for transferring electrical triggering energy from said electrical energy storage apparatus, wherein the electrical triggering energy is used, or usable, to effect a triggering of a switching operation of said at least one fast-switching switching element, wherein said mechanical energy store is effective to perform the switching operation with the drive energy stored in said mechanical energy store; and Column 6, Lines 34-36, Claim 13 should read as follows:
13. The system according to claim 11, wherein the warning signal is transmitted to said control unit connected to said at least one fast-switching switching element.

Signed and Sealed this
Twenty-third Day of January, 2024

Katherine Kelly Vidal
*Director of the United States Patent and Trademark Office*